United States Patent [19]
Edwards et al.

[11] Patent Number: 5,506,728
[45] Date of Patent: Apr. 9, 1996

[54] DUAL COMBINER EYEPIECE

[75] Inventors: Tim J. Edwards, San Jose; Mayer Rud, Sunnyvale, both of Calif.

[73] Assignee: Kaiser Aerospace & Electronics Corporation, Foster City, Calif.

[21] Appl. No.: 258,412

[22] Filed: Jun. 10, 1994

[51] Int. Cl.$^6$ ..................................... G02B 27/14
[52] U.S. Cl. .................... 359/629; 359/630; 359/631; 359/633; 359/634
[58] Field of Search ................... 359/629, 630, 359/631, 632, 633, 634, 636, 13, 608, 583

[56] References Cited

U.S. PATENT DOCUMENTS

| | | | |
|---|---|---|---|
| 3,589,796 | 6/1971 | Schaefer | 359/631 |
| 4,099,841 | 7/1978 | Ellis | 359/630 |
| 4,611,877 | 9/1986 | Ellis | 359/630 |
| 4,655,540 | 4/1987 | Wood | 359/630 |
| 5,007,711 | 4/1991 | Wood | 359/13 |
| 5,181,012 | 1/1993 | Furuya | 359/630 |
| 5,200,844 | 4/1993 | Suvada | 359/40 |
| 5,278,696 | 1/1994 | Suvada | 359/629 |
| 5,398,134 | 3/1995 | Ikegaya | 359/630 |

*Primary Examiner*—Georgia Y. Epps
*Assistant Examiner*—Ricky Mack
*Attorney, Agent, or Firm*—Marvin H. Kleinberg; Marshall A. Lerner; Michael J. Ram

[57] ABSTRACT

A combiner eyepiece with an enhancement imagery source and a collimating mirror is equipped with two oblique partially reflective mirrors. Both mirrors reflect some of the light impinging on their partially reflective sides and transmit substantially all of the rest of such light. The result is a collimated beam of light travelling toward the viewer along the viewing axis and expanded in vertical extent. This expanded vertical extent eases the requirement for the viewer to place his eyes in a precise location at the near end of the eyepiece. It also allows a smaller and lighter construction for an eyepiece where the vertical extent of the viewing area has been specified.

10 Claims, 1 Drawing Sheet

DUAL COMBINER EYEPIECE

BACKGROUND OF THE INVENTION

Image combiner eyepieces are a useful part of current technology. Such a device is typically used to superimpose relevant information (e.g. target or road and rail network information) over the field of view available to an observer. In this way, the observer can assimilate information from several sources without diverting his attention from the real scene in his line of vision.

It has been difficult, however, to design a light, compact eyepiece which accurately maps the enhancement information onto the outside view. Two related problems complicate the design process. The first problem is the need to project the enhancement image to a distance of virtual infinity, the farthest distance to which the human eye can specifically focus. The second problem is the need to provide a "viewing area" of an acceptable size.

The human eye determines the relative angular location of objects by the orientation of the light wave that reaches the eye from that object. For close objects, the orientation of the light wave from an object changes as one moves one's eyes relative to that object. For objects up to about 8 feet away the two eyes determine the angular difference between the light reaching each of them. The brain uses this information to form a stereoscopic distance estimate. For distant objects, by the time the light reaches the observer, it has spread out spherically and the sphere shell portion that reaches a particular distant observer is essentially a plane wave with parallel rays.

As a result, a distant scene doesn't change appearance as one moves a short distance. The relative position of a close object in front of a distant scene, however, does change with such movement. This is one reason why the enhancement imagery, which by necessity is generated quite close to the viewer, must be projected to virtual infinity. Otherwise, the position of the enhancement imagery would change relative to the outside scene whenever the viewer moved his head. As the physical features depicted in the enhancement imagery will almost always be located at virtual infinity, this position change would be unrealistic and inaccurate. Another reason for projecting the enhancement image to infinity is so that the viewer is not required to refocus his eyes to see it clearly.

In order to make a close object appear at virtual infinity, the rays of light from that object are caused to be parallel over a particular region. Light that has been directed in this manner is referred to as "collimated" light.

One problem with collimated light is that, unlike light that is reflected from a random object, collimated light does not propagate outwardly in all directions. Instead, it travels in a beam, strictly in one direction. As a result, in order to receive collimated light from a particular source, the eye must be at the correct location. Otherwise, the beam of collimated light will be completely missed and no light source will appear to the observer.

Image combiner eyepieces, such as the present invention, are designed to have a specific location where a viewer may place his eyes. This location is known as the "viewing area". The size of the viewing area is important because it determines whether a viewer can place his eyes at slightly different locations and still obtain a clear image. For a very small viewing area, any slight movement on the part of the viewer would cause the image to disappear. The width and height of the beam of collimated light from any particular point source determines the size of the viewing area of an eyepiece.

Generally, in the design of eyepieces for use with enhanced imagery, a particular viewing area size is specified in order to allow the user to shift eye location with respect to the eyepiece without immediately losing sight of the enhancement imagery. Also, a large enough viewing area size accommodates different users whose facial structures and viewing postures may cause them to use the eyepiece with their eyes positioned slightly differently relative to the viewing area.

It should be noted that a number of other approaches to the problem of displaying information at virtual infinity have been disclosed in prior art patents. All of the relevant patents cited here, however, are from the related field of head up displays. Although some of the problems encountered in designing head up displays are similar to those encountered in the design of image combining eyepieces, there are some noticeable differences. A review of the relevant differences will help to explain the different function of some apparently similar structures found in both the prior art references and in the present invention.

As in the field of the present invention, the object of a head up display is to superimpose information and/or imagery over the real field of view of the observer. In a head-up display this is achieved by collimating the light emitted from the information or image source and then projecting it toward a partially reflective mirror oriented at about a 45° angle with respect to the observer. (A partially reflective mirror reflects a portion of the light impinging on one side and also transmits a portion of the light impinging on the other side.) In the case of the head up display application, a portion of the light from an image source is reflected to the observer while a portion of the light from the real world is transmitted through the partially reflective mirror to the observer. The observer, however, is located at a much greater distance (measured in feet) from the display screen than is the case for the user of an eyepiece (measured in inches). As a result, the mirror onto which the image is projected must be much larger to convey the same angular field of view. The geometry of the inside of the vehicle in which the head-up display is used sometimes may make it difficult to position a large mirror supporting the necessary field of view. To solve this problem, multiple partially reflective combining mirrors may be used to allow multiple viewing geometries of the collimated image source thereby allowing to the observer a larger angular field of view.

In addition, the collimating mechanism for a head-up display may be considerably larger than the same mechanism for an eyepiece. This is because, an eyepiece must be light and compact in order to be easily maneuvered to the eyes of the viewer and then easily removed when no longer needed. As the collimating mechanism must be included in the eyepiece, it must also be small and light. The collimating mechanism for a head up display, on the other hand, can be a stationary, built in item, which need not be moved to be used. As a result, this mechanism may be considerably larger than the comparable item for an eyepiece. With a large collimator, it is possible to get a wide beam of collimated light for every point of light emitted by the image generator. Therefore, it is usually not necessary to further widen the collimated beam in the image combining mechanism.

Because of the different nature of the problems facing the designer of an eyepiece in contrast to those facing the designer of a head up display, a device used for one purpose in a head-up display would not suggest that a similar structure be used for a completely different purpose in an eyepiece.

The prior art references that include multiple combiner screens are, Ellis, U.S. Pat.No. 4,099,841; Ellis, U.S. Pat.

No. 4,611,877; Wood, U.S. Pat. No. 4,655,540; and Suvada, U.S. Pat. No. 5,200,844, which is assigned to the assignee of the present invention. Also, the copending application of Suvada, Ser. No. 07/887,546, (assigned to the assignee of the present invention) also includes a reference to such a feature. In all of these cases, the multiple combiner screens are used to increase the field of view or enhance holographic effects rather than to expand the viewing area. In Suvada '844 the different screens have color specific reflective characteristics to enhance the color display.

One may gain a general appreciation for the different sorts of problems faced by head-up display designers by examining the prior art patents. Starting with the earliest, Ellis '841 discloses an image combiner mechanism including three partial mirrors with varying degrees of reflectivity and transmissiveness to achieve an evenly bright display of enhancement and real world imagery from each of the three partial mirrors. This creates a large field of view for the observer.

Ellis '841 also briefly discloses a mechanism for the collimation of the light from the imagery/information source, which, in that disclosure was a cathode ray tube. Two sets of lenses, separated by approximately 1 foot, collimate the light. A bend may be introduced between the two sets of lenses with a mirror reflecting the light rays toward the second set. One may note that a 1 foot distance to permit a more complete collimation is not available in an eyepiece.

Ellis '877 shows an improved mechanism for light collimation. A wedge shaped piece of glass is added between the first and second sets of lenses. This bends the light more efficiently than the mirror disclosed in the previous Ellis patent.

Raber, U.S. Pat. No. 4,729,634, uses first and second cooperative and converging mirror elements to produce a collimated beam from a CRT. This reference combines the lens and mirror functions which are separate in the Ellis patents into two curved, one way mirrors. The combination of elements allows a more compact design and prevents destructive internal reflections.

Ferrer, U.S. Pat. No. 4,799,765 permits the projection of images from two sources onto two different display panels. The primary imagery source is reflected from a mirror which will selectively transmit light of a particular frequency. This imagery is then displayed on a curved partially reflective mirror directly in front of the pilot. The secondary imagery (generally flight information) is emitted in the form of light of the frequency passed by the mirror. This light passes through the mirror and is displayed on a screen which is in front of and down from the user's eye location.

Banbury, et al., U.S. Pat. No. 4,927,234 discloses a single screen head up display. A double fold is introduced into the optical axis in order to reduce the size of the device. There is no structure or suggestion, however, of a double partially reflective mirror to increase the vertical extent of the collimated beam as we find in the present invention.

Wood et al., U.S. Pat. No. 4,655,540, and Suvada, U.S. Pat. No. 5,200,844, both use multiple display screens to achieve holographic effects. Wood '540 uses a double display screen to overcome the problems imposed by the duality between the spectral bandwidth and angular bandwidth of a hologram. By using two screens a smaller range of viewing angles is imposed on each and the spectral bandwidth may be increased.

Suvada, U.S. Pat. No. 5,200,844, discloses three different display screens, each one tuned to a different wavelength of light. This enhances the color intensity of a color display. There is no suggestion in this reference, however, to a collimated beam of greater vertical extent.

Suvada, copending application Ser. No. 07/887,546, discloses a prism arrangement for redirecting collimated light in a head-up display. This is more efficient than performing the same function by means of a mirror. Although more than one display screen mirror may be used in this disclosure, this is again directed toward increasing the users field of view rather than his viewing area.

One prior art arrangement, which has been utilized in various helmet mounted display applications to both map the enhancement imagery over the outside scene and to project it to infinity is to place a partially reflective mirror at approximately a 45° angle to the line of sight of the viewer. A partially reflective mirror is a mirror that reflects a portion of the light impinging on one surface and also allows a portion of the light impinging on its other surface to pass through it. The enhancement image is then transmitted through the partially reflective mirror from the image source at the top to a spherical mirror located at the bottom of the device where it is collimated and reflected back toward the partially reflective mirror. Part of the collimated light reflected from the spherical mirror is reflected from the partially reflective mirror to the observer's eye. This light is also combined with the imagery from outside the vehicle which enters the transparent far end of the eyepiece and is transmitted through the partially reflective mirror to the observers's eye.

A specified viewing area size controls the design of the eyepiece. The required viewing area size dictates the distance at which the spherical mirror must be placed from the enhancement imagery source to effect a wide enough collimated beam. This determines the dimensions of the eyepiece. One way to reduce the size of the eyepiece is to construct it out of a block of high refraction-index plastic. This allows the same size enhancement imagery source to be reflected from a smaller and closer spherical mirror section. Such a construction is also very sturdy. Of course, it is also quite a bit heavier than a construction in which only air separates the various optical elements.

SUMMARY OF THE INVENTION

The present invention is intended to permit an eyepiece of given dimensions to present a viewing area with a greater vertical extent than would be possible otherwise. Conversely, it allows an eyepiece with smaller dimensions to achieve a required viewing area size, resulting in a lighter, more easily moved eyepiece than would be possible otherwise.

For ease of presentation, this section describes a device where the enhancement imagery source is on the "top" of the device and the collimating mirror is on the "bottom". Other arrangements are possible and this description is not intended to limit the scope of the invention to any particular geometry of the elements.

According to the present invention, two or more oblique, identically oriented, partially reflective mirrors are used to reflect the imagery (already reflected from a collimating mirror) to the viewer. Each mirror is "partial one-way" in the sense that substantially all of the light incident on any one of them from the "back" or enhancement image source is passed through the mirror whereas a portion of the light striking it from the "front" is passed through the mirror and the other portion of the light is reflected toward the viewer. However, the top most mirror is preferably designed to reflect substantially all of the light impinging on it's "front" face from the collimating mirror.

The effect of the multiple mirror arrangement is that each collimated beam of light reflecting from the collimating mirror (and representing one luminous point on the enhancement imagery source) is lengthened in vertical extent by the vertical distance between the two mirrors. This is because the top of the collimated beam reflected from the top mirror will be this distance above the top of the collimated beam reflected from the bottom mirror.

As a typical separation measured along the perpendicular axis is 7 millimeters, the vertical separation is typically 7 mm * cos45° =5 mm. It should be noted that the vertical separation between the two mirrors must not be greater than the vertical extent of the collimated beam from a particular point source in the image generator. If the separation were greater than this amount, the viewing area would be broken up into two separate pieces for every point source. Thus, if the viewer moved his eyes from the bottom to the top of the viewing area, each discrete point would momentarily disappear somewhere in that interval.

The novel features which are characteristic of the invention, both as to structure and method of operation thereof, together with further objects and advantages thereof, will be understood from the following description, considered in connection with the accompanying drawings, in which the preferred embodiment of the invention is illustrated by way of example. It is it be expressly understand, however, that the drawings are for the purpose of illustration and description only, and they are not intended as a definition of the limits of the invention.

DESCRIPTION OF THE PREFERRED EMBODIMENT

Figure 1:
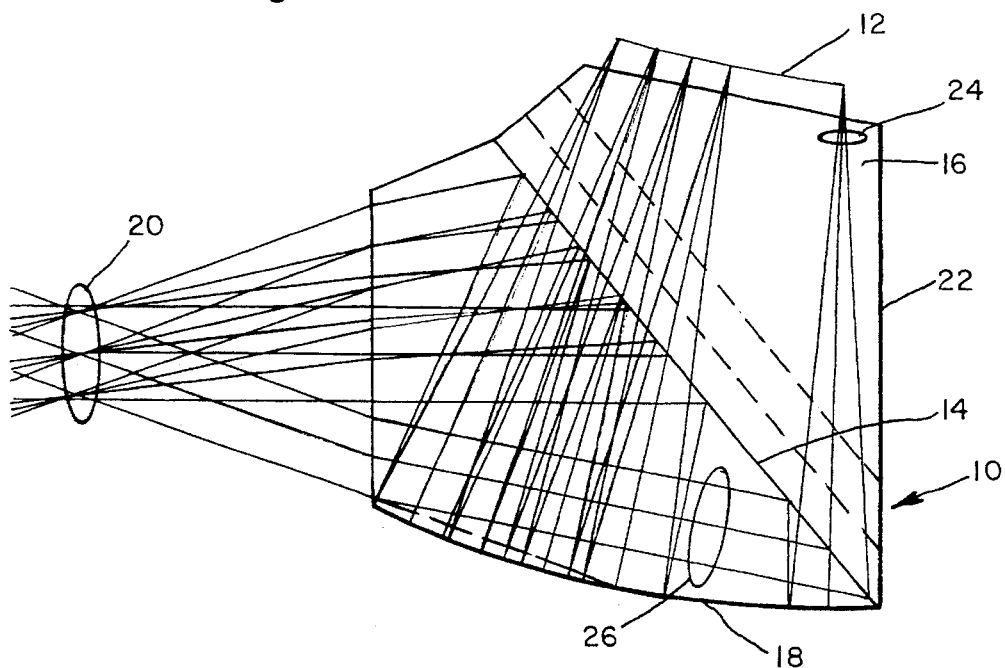
FIG. 1 is an expanded cross-sectional side view of a prior image combiner eyepiece.

FIG. 1 shows a conventional image combiner eyepiece 10 of the prior art. An enhancement image source 12 emits light toward the top or "rear" side of an oblique partially reflective mirror 14 along a common axis which is orthogonal to the viewing axis along which the observer views the image. The light from the source 12 is refracted upon entering a unitary block of transparent, high refraction index (typically >1.6) plastic 16, is passed through the partially reflective mirror 14 and is reflected by a collimating mirror 18. The reflected light is returned on the common axis and re-reflected by the front face of the mirror 14 toward the viewing area 20 along a viewing axis orthogonal to the common axis. Upon leaving the block of plastic 16 the light is refracted again.

The exterior scene from outside the vehicle enters the eyepiece 10 from the far end 22 of the eyepiece 10 and travels along the viewing axis. This imagery is then combined with the enhancement imagery as it passes through the partially reflective mirror 14. The viewer, therefore, sees the outside scene with the enhancement information superimposed upon it, apparently at the distance of virtual infinity.

Note, however, that as not all of the light 24 from a particular point on the enhancement image source is collimated by the collimating mirror 18, the resultant beam 26 of collimated light is of a finite width. The width of the collimated beam 26 determines how accurately the viewer must place his eyes at the viewing area 20 in order to see the enhancement information. It is important to have a wide collimated beam so that the viewer is not required to maintain eye position with great accuracy.

Figure 2:
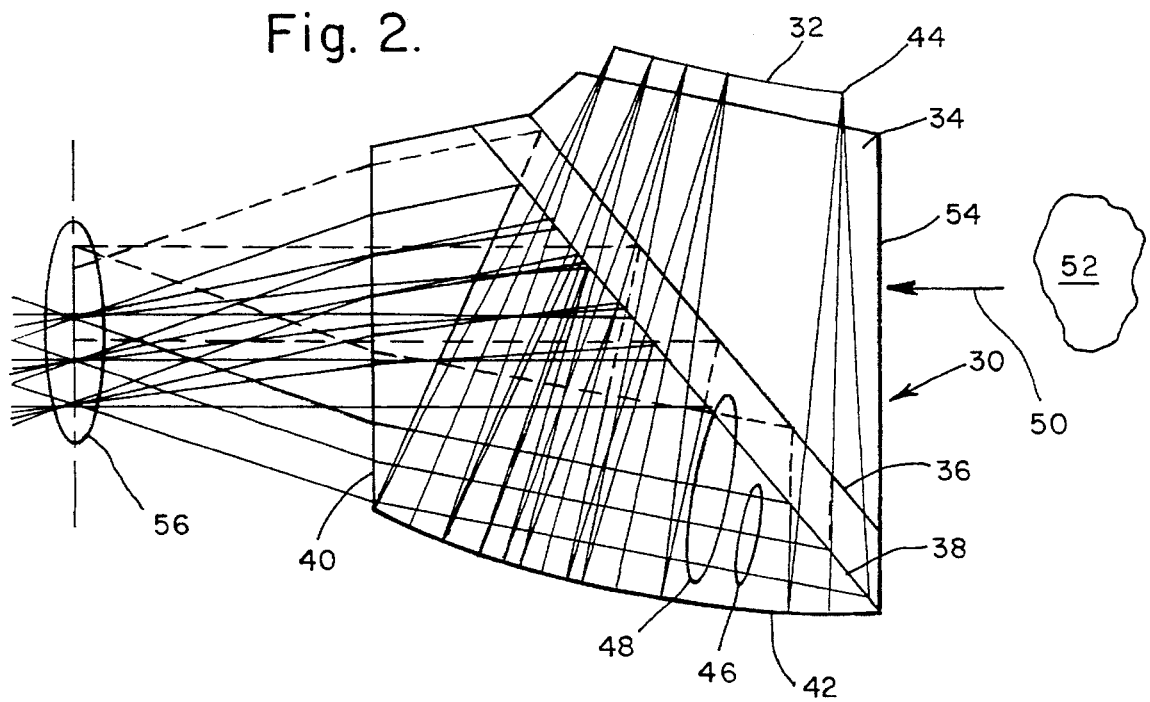
FIG. 2 is an expanded cross-sectional side view of an image combiner eyepiece according to the present invention.

FIG. 2 shows an image combining eyepiece 30 according to the present invention. As in the prior art, an enhancement image source 32 emits light along a common axis which enters a unitary block 34 of transparent, high refraction index (typically >1.6) plastic. The light passes through upper and lower identically oriented partially reflective mirrors 36 and 38, respectively, and is reflected from a collimating mirror 42 along the common axis. Of the light that impinges on the front of the lowermost partially reflective mirror 38, some is reflected along a viewing axis and almost all of the rest passes through. The uppermost mirror 36, however, may be designed to reflect substantially all of the light striking its face from the bottom. This is because, unlike lower mirror 38, it need not allow a portion of the light to be passed through it in order to be reflected by yet another partially reflective mirror, still more distant from the collimating mirror 42 along the common axis.

The light then passes through the near end 40 directed along the viewing axis of the eyepiece 30 where it is refracted by the change in medium. As in the prior art, the one way mirrors 36,38 serve to combine the enhancement imagery with the imagery from outside of the vehicle which enters from the transparent far side of the eyepiece along the viewing axis.

The effect of the two mirror arrangement can be seen in FIG. 2. A portion of the light from one of the several sources within the enhancement image source 32, is collimated by the collimating mirror 42 resulting in a beam 46. This light is redirected toward the viewer by reflection off of the front of the lowermost partially reflective mirror 38. But the width of the beam would be unaffected by one mirror acting alone. Each of the mirrors 36,38 redirect a portion of the light in the beam which reaches it at a different vertical location than the other mirror. The combination of the redirected beams 48 is, therefore, greater in vertical extent than a single redirected beam would be by itself.

Light 50 representing the outside scene 52, also enters the eyepiece 30 from the far end 54 along the viewing axis and is combined at the oblique partially reflective mirrors 36,38 with the enhancement imagery.

As one might gather from the illustration, no pair of immediately adjacent partially reflective mirrors may be separated in vertical position along the common axis by a distance greater than the width of the beam formed by the collimating mirror 42 from the light emitted by a single point 44 on the enhancement imagery source 32. Otherwise, there would be a blank spot in the viewing area 56 of the device, where, if a user positioned his eyes there, he would miss the image.

In summary, the invention includes at least one partially reflective mirror 38 interposed along the common axis between the collimating mirror 42 and a full or partially reflective mirror 36. These two mirrors 36,38 reflect, and redirect to the direction of the viewing axis, the collimated beam at two overlapping vertical positions. The result is a collimated beam increased in vertical extent from each point of enhancement imagery. This imagery is superimposed on the real world imagery 52 which enters the far end 54 of the device 30 and passes through the rear faces of the partially reflective mirrors 36 and 38 along the viewing axis.

Please note that although the drawings show only two image combining partially reflective mirrors, more could be used to achieve an even greater expansion of the image presented at the viewing area. Of course the more such mirrors are used the less light may be allowed to reflect from each of them, so there is some practical limit imposed by the potential intensity of the enhancement imagery source on just how many partially reflective mirrors could effectively be incorporated into a design.

What is claimed is:

1. An image combiner eyepiece with a viewing axis, a common axis orthogonal to the viewing axis and a transparent near and far end, said eyepiece further including:
    a first partially reflective mirror positioned obliquely with respect to the viewing axis and the common axis, for transmitting a substantial portion of the light impinging on one side of said mirror and reflecting a substantial portion of the light impinging on the other side of said mirror;
    an enhancement image source displaced from the partially reflective mirror on the common axis and emitting an enhancement image along the common axis toward the non-reflective side of said partially reflective mirror;
    a collimating mirror located on the side of the partially reflective mirrors directly opposite from said enhancement image source, said collimating mirror oriented with its reflective surface facing said enhancement image source;
    at least one additional partially reflective mirror, placed in parallel to said first partially reflective mirror but located on the common axis so it is between the collimating mirror and the partially reflective mirror, said additional partially reflective mirror designed to transmit a substantial portion of the light impinging on it from the side facing the image source and to partially reflect and partially transmit the light impinging on it from the other side; and
    a viewing area at a location which is closer to the transparent near end than the transparent far end where a predetermined portion of the enhancement image source is visible;
    whereby said collimating mirror collimates a portion of the light transmitted from each illuminated point of said enhancement image source and said partially reflective mirrors reflect the reflected collimated enhancement image toward the near end of the eyepiece for combining the enhancement image with the images entering the eyepiece from the far end along the viewing axis and increase the size of the viewing area.

2. The image combining eyepiece of claim 1 in which said partially reflective mirrors are wholly within a block of transparent solid material.

3. The image combining eyepiece of claim 2 in which said block of transparent solid material is a plastic with an index of refraction between 1.45 and 2.00.

4. The image combining eyepiece of claim 2 in which said transparent solid material is formed into a unitary block extending along the common axis from said enhancement imagery source to said collimating mirror, and, along the viewing axis to the near and far ends of the eyepiece.

5. The image combining eyepiece of claim 1 in which said partially reflective mirror closest to the enhancement image source reflects substantially all of the light impinging on its reflective side.

6. An image combiner eyepiece with a viewing axis, a common axis orthogonal to the viewing axis and transparent near and far ends, said eyepiece further including:
    a first partially reflective mirror positioned obliquely with respect to the viewing axis and the common axis, for transmitting a substantial portion of the light impinging on one side of said mirror and reflecting a substantial portion of the light impinging on the other side of said mirror;
    an enhancement image source displaced from the partially reflective mirror on the common axis and emitting an enhancement image along the common axis toward the non-reflective side of said partially reflective mirror;
    a collimating mirror located directly opposite from said enhancement image source along the common axis, said collimating mirror oriented with its reflective surface facing said enhancement image source;
    at least one additional partially reflective mirror, oriented identically to said first partially reflective mirror but located on the common axis so that it is between said collimating mirror and said first partially reflective mirror, said additional partially reflective mirrors designed to transmit a substantial portion of the light impinging on it from the side facing the image source and to partially reflect and partially transmit the light impinging on it from the opposite side; and
    a viewing area at a location which is closer to the transparent near end than the transparent far end where a predetermined portion of the enhancement image source is visible; and
    a unitary block of solid, transparent material encasing said first partially reflective mirrors and joined to the reflective side of said collimating mirror;
    whereby said collimating mirror collimates a portion of the light transmitted from each illuminated point of said enhancement image source and said first partially reflective mirror, and said additional partially reflective mirror reflect the collimated enhancement image along the viewing axis toward the near end of the eyepiece for combining the enhancement image with images entering the eyepiece from the far end along the viewing axis; and increase the size of the viewing area.

7. The image combining eyepiece of claim 6 in which the spacing between any two adjacent partially reflective mirrors along the common axis is no greater than the smallest in vertical extent beam of collimated light that is generated by the combination of said enhancement source and said collimating mirror.

8. The image combining eyepiece of claim 6 in which said unitary block of solid, transparent material is a plastic with an index of refraction between 1.45 and 2.00.

9. The image combining eyepiece of claim 6 in which said transparent solid material is formed into a unitary block extending along the common axis from said the enhancement image source to said collimating mirror and along the viewing axis from the near to the far end of the eyepiece.

10. An image combiner eyepiece with a viewing axis, a common axis orthogonal to the viewing axis and transparent near and far ends, said eyepiece further including:
    a first partially reflective mirror positioned obliquely with respect to the viewing axis and the common axis, for transmitting along the common axis a substantial portion of the light impinging on one side of said mirror and reflecting along the viewing axis a substantial portion of the light impinging on the other side of said mirror;
    an enhancement image source displaced from the partially reflective mirror along the common axis and emitting an enhancement image along the common axis toward the non-reflective side of said partially reflective mirror;

a collimating mirror located directly opposite from said enhancement image source, along the common axis said mirror oriented with its reflective surface facing said enhancement image source;

a second partially reflective mirror, oriented identically to said partially reflective mirror but located on the common axis so that it is between said collimating mirror and said partially reflective mirror, said partially reflective mirror designed to transmit a substantial portion of the light impinging on it along the common axis from said image source and to partially reflect and partially transmit the light impinging on it from said collimating mirror;

a unitary block of transparent plastic with an index of refraction between 1.45 and 2.00 encasing said partially reflective mirrors and joined to the reflective side of the collimating mirror; and a viewing area at a location which is closer to the transparent near end than the transparent far end where a predetermined portion of the enhancement image source is visible;

whereby said collimating mirror collimates a portion of the light transmitted from each illuminated point of said enhancement image source and said first and second partially reflective mirrors reflect the collimated enhancement image along the viewing axis toward the near end of the eyepiece for combining the enhancement image with the images entering the eyepiece from the far end along the viewing axis and increase the size of the viewing area.

* * * * *